(No Model.) 2 Sheets—Sheet 1.

H. G. FARR.
CAR AXLE LUBRICATOR.

No. 348,729. Patented Sept. 7, 1886.

Witnesses.
W. P. Clough.
H. W. Stearns.

Inventor.
Hiram G. Farr,
pr Norman W. Stearns,
Atty.

(No Model.) 2 Sheets—Sheet 2.
H. G. FARR.
CAR AXLE LUBRICATOR.
No. 348,729. Patented Sept. 7, 1886.
Fig: 4.
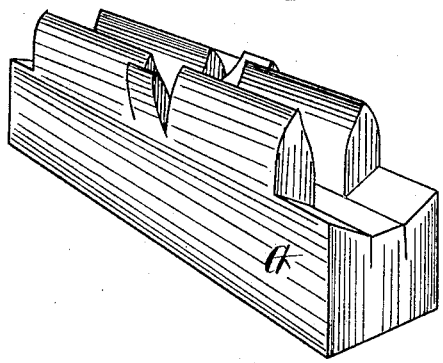
Fig: 5.
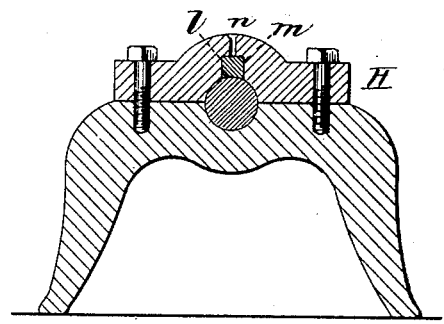
Fig: 6.
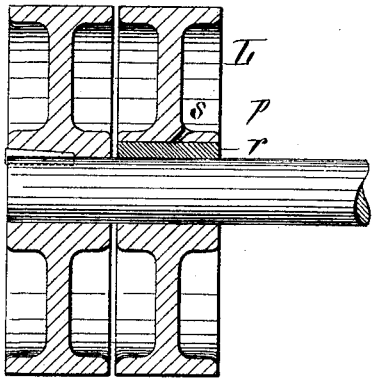
Fig: 7.
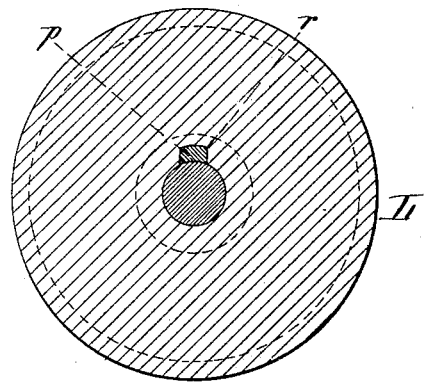
Witnesses.
H. W. Stearns
W. P. Clough
Inventor.
Hiram G. Farr,
pr Norman W. Stearns,
Atty.

UNITED STATES PATENT OFFICE.

HIRAM G. FARR, OF BOSTON, ASSIGNOR OF ONE-HALF TO THEOPHILUS KING, OF QUINCY, MASSACHUSETTS.

CAR-AXLE LUBRICATOR.

SPECIFICATION forming part of Letters Patent No. 348,729, dated September 7, 1886.

Application filed February 5, 1886. Serial No. 190,890. (No model.)

*To all whom it may concern:*

Be it known that I, HIRAM G. FARR, of Boston, in the county of Suffolk and State of Massachusetts, have invented certain Improvements in Lubricating Bearings for the Journals of Car-Axles, &c., of which the following is a full, clear, and exact description, reference being had to the accompanying drawings, making part of this specification, in which—

Figure 1:
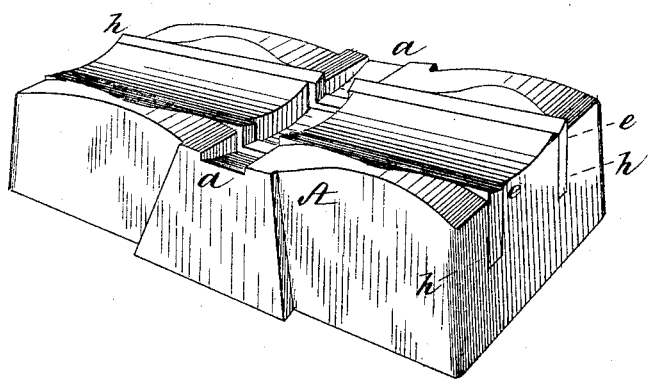
Figure 2:
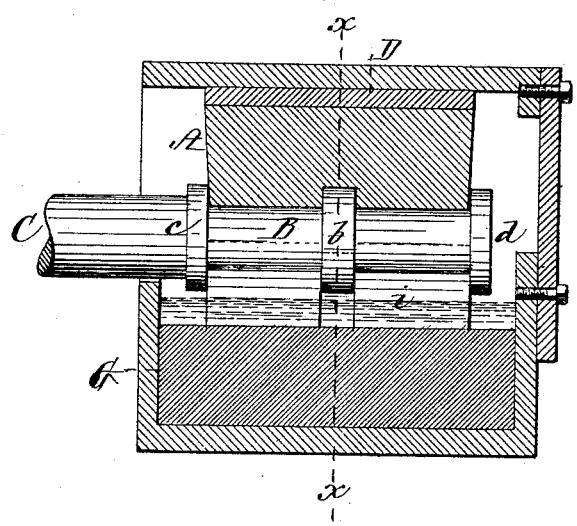
Figure 3:
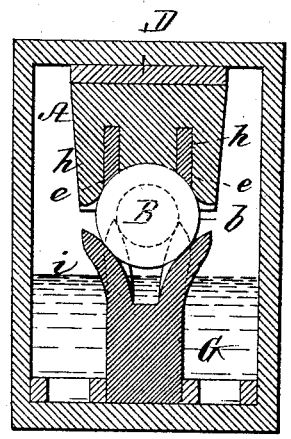

Figure 1 is a perspective view of my improved bearing inverted. Fig. 2 is a longitudinal section through the center of the same applied to the journal of a car-axle; Fig. 3, a transverse section on the line $x\ x$ of Fig. 2; Fig. 4, a perspective view of a block of felt which is preferably employed under the axle in connection with my aforesaid bearing, said block of felt, however, forming the subject of another application for patent filed simultaneously herewith; Fig. 5, a transverse section showing the application of my invention to the ordinary bearing for shafting. Fig. 6 shows the application of my invention to the hub of a loose pulley; Fig. 7, a transverse section of Fig. 6.

The aim of my present invention is the reduction of the friction and consequent wear of the journals of car-axles, shafting of machinery, loose pulleys, &c., and the surfaces of the bearings or parts with which they come into contact; and this invention has for its prominent feature a bearing located above the journal and provided with one or more grooves or channels, in combination with and for the reception of one or more strips of felt or other similar absorbent material supplied with a lubricant, this feature of my invention being preferably, but not necessarily, associated with a block or strip of similar absorbent material located under an axle rotating in an axle-box having an oil-reservoir, a similar strip of absorbent material being also applied to the bearing of ordinary machine-shafting, and being preferably located within a groove in the upper part of the bearing, with an oil-passage communicating therewith.

In the said drawings, A represents a metal bearing, provided with a transverse groove, $a$, located at the center of its under side, for the reception of an annular shoulder or projection, $b$, formed on the journal B of a car-axle, C, at a point about one-half the distance between other two annular shoulders or projections, $c\ d$, thereof. Longitudinally within the bearing A, and extending from its under side to a depth equal to about one-half of its thickness, are formed two parallel grooves, $e\ e$, situated equidistant from a vertical plane passing through the axis of the journal. Within the grooves $e\ e$ are located strips $h\ h$, of any suitable absorbent material—for instance, felt or other textile fabric of similar capacity—for taking up the lubricant $i$, located in the axle-box, which lubricant, when reaching up to or above the bottom of the journal, is carried up by its rotation and fed to the strips $h\ h$, which thus become saturated with and transmit the desired quantity of the lubricant to the lower surface of the bearing A in contact therewith, whereby the wear of the journal and the under side of the bearing A is reduced to a minimum and the speed desired is obtained with the least expenditure of power. Where the journal is not provided with a central or intermediate annular projection, the groove $e$ in the bearing is omitted, the latter being prevented from any lateral movement independently of the journal by its two other annular shoulders, $c\ d$, while the bearing is kept from any vertical movement independently of the axle-box by means of a plate or key, D, interposed between them. (Figs. 2 and 3.) The efficiency of this feature of my invention (to wit, the bearing) is enhanced by the employment of a block of felt, G, (one form of which is shown in Fig. 4,) located under and in contact with the rotating journal, said block G being cut away in such manner at its ends and center to adapt it to fit the annular projections $b\ c\ d$ of the journal, or otherwise formed to fit and properly receive the journal when differently constructed, the block of felt G under the journal being, however, not necessarily associated with the prominent feature of my invention— to wit, the grooved bearing A, with its strip or strips, $h\ h$, of felt above the journal; and I here state that a block, G, of felt under the journal forms no part of this portion of my invention, as it is the subject-matter of another application for patent made simultaneously and bearing even date herewith.

In its application to the bearing of ordinary machine-shafting the under side of the upper portion of the bearing H in contact with the upper portion of the shaft is provided with a single groove, $l$, cut transversely with the bearing for the reception of a single strip, $m$, of felt, (see Fig. 5,) and an oil-passage, $n$, leads from the top of the bearing down thereto.

To apply this invention to a loose pulley, L, it is simply necessary to form a groove, $p$, within the hub for the reception of a strip, $r$, of felt, to which the lubricant is supplied by a passage, $s$, leading in an inclined direction thereto from the outside of the upper part of the hub.

I claim—

A bearing, A, having in its under side a pair of longitudinal grooves, $e$ $e$, and a transverse groove, $a$, located intermediate of its ends, in combination with and for the reception of strips, $hh$, of felt, &c., and a journal, B, having an annular shoulder, $b$, as and for the purpose specified.

Signed this 2d day of February, 1886.

HIRAM G. FARR.

In presence of—
   N. W. STEARNS,
   H. W. STEARNS.